United States Patent [19]
Albright et al.

[11] Patent Number: 5,055,197
[45] Date of Patent: Oct. 8, 1991

[54] PROCESS FOR REMOVING RESIDUAL MONOMERS AND OLIGEMERS FROM AMINE-CONTAINING POLYMERS

[75] Inventors: Robert L. Albright, Churchville; Jon R. Fisher, Hatfield; Eric G. Isacoff, Richboro; Eric C. Peters, Philadelphia, all of Pa.

[73] Assignee: Rohm and Haas Company, Philadelphia, Pa.

[21] Appl. No.: 681,038

[22] Filed: Apr. 5, 1991

[51] Int. Cl.$^5$ .............................................. B01D 61/16
[52] U.S. Cl. .................................. 210/638; 210/651; 210/259
[58] Field of Search .................... 204/181.7; 210/638, 210/651, 650, 259

[56] References Cited

U.S. PATENT DOCUMENTS 4,624,762 11/1986 Abbey et al. ..................... 204/181.7

Primary Examiner—Frank Spear
Attorney, Agent, or Firm—John E. Taylor, III

[57] ABSTRACT

Treatment of water-soluble, amine-containing polymers with strong acid, cation exchange resins from aromatic copolymer crosslinked with 2-25% polyvinyl crosslinker, followed by ultrafiltration with a membrane filter having a molecular-weight cutoff, measured against the polymers to be treated, of about 10,000 to about 15,000, results in a highly effective removal of residual monomers and oligomers of less than 500 molecular weight.

11 Claims, No Drawings

PROCESS FOR REMOVING RESIDUAL MONOMERS AND OLIGEMERS FROM AMINE-CONTAINING POLYMERS

This invention relates to purification of liquid polymers or aqueous polymer solutions. It relates more particularly to the removal, by cation exchange and subsequent ultrafiltration, of residual monomers and oligomers from polymers containing amine groups.

BACKGROUND OF THE INVENTION

Residual monomers and oligomers tend to remain in the reaction mixture following polymerization of monomers to form polymers. Many different approaches are taken to remove them, ranging from "chasing" the reaction mixture with additional polymerization initiator to passing the mixture through an ultrafiltration membrane whose molecular-weight cutoff is higher than the molecular weight of the oligomers but substantially lower than that of the polymer. Ion exchange has also been used to remove monomers and oligomers from polymers.

Residual monomers and oligomers may have varying degrees of toxicity when the polymer containing them is administered to the body, intravenously, orally or otherwise. Because of this, it is particularly desirable to reduce residual monomers and oligomers to low levels in polymers intended for pharmaceutical applications; preferred is less than 1000 parts per million (ppm) and more preferred is less than 100 ppm.

Of particular interest are polymers that are useful for controlling cholesterol in the blood of animals or human beings. Strongly basic, polymeric ion-exchange materials form an ionic bond with the acid groups of bile acids, removing those acids from the digestive tract before they can form cholesterol. Reducing the levels of residual monomers and oligomers in these polymeric materials is particularly important to their pharmaceutical acceptability.

SUMMARY OF THE INVENTION

We have discovered a process by which residual monomers and oligomers with molecular weights smaller than about 500 daltons can be removed from a polymer composition, which process comprises the sequential steps of first treating the composition with a strong-acid cation exchange resin with a crosslinker level from about 2% to about 25%, and subsequently subjecting the composition to ultrafiltration with an ultrafiltration membrane to remove the remaining monomers and oligomers from the ultrafiltration retentate, wherein the polymer composition comprises linear, amine-containing polymers having a molecular weight within the range of from about 2000 to about 10 million daltons, or solutions thereof in water or a lower alcohol, and wherein the membrane has a molecular weight cutoff, measured against the amine-containing polymers, of from about 10,000 to about 15,000 daltons. We have further discovered polymer compositions comprising linear polymers containing amine groups, the compositions having surprisingly low levels of residual monomers and oligomers, prepared by this process.

DETAILED DESCRIPTION OF THE INVENTION

The process of the present invention is particularly surprising because the reduction of residual monomers and oligomers in polymers containing amine groups is significantly greater when the polymers are treated by cation exchange followed by ultrafiltration, than when the polymers are first subjected to ultrafiltration and then treated by cation exchange. Because the two processes would appear to be independent, one of ordinary skill in the art would expect the order in which they are performed to have no effect upon the effectiveness of the monomer and oligomer removal.

The ion exchange resins which are useful in the practice of the present invention are strong-acid, aromatic cation exchange resins, that is, they are made by functionalizing aromatic copolymers with strong-acid functional groups, preferably sulfonic acid groups. Preferably the copolymer is crosslinked with from about 2 to about 25%, and more preferably from about 2 to about 10%, crosslinking monomer. While not wishing to be bound by theory, we believe that resins with crosslinking levels of more than about 25% have micropores which are too small to admit the monomer. Resins with crosslinking levels of less than about 2% suffer from large volume changes as the resin is cycled through loading and regeneration cycles, which produces undesirably high resistance to flow through the column. Resins of both gel and macroporous structure may be used in practicing the present invention.

The ultrafiltration membranes we have found particularly useful in the practice of the present invention have a molecular-weight cutoff of about 10,000 to about 15,000 daltons when measured against the particular polymers from which the monomers and oligomers are to be removed. Measurement against poly(ethylene glycol), referred to herein as PEG, is an industry standard to generally characterize the permeability of a membrane, and a particular cutoff value for PEG does not necessarily mean that the cutoff value will be the same for another polymer. For example, membranes found to have a molecular-weight cutoff for poly(dimethylaminopropyl methacrylmide), referred to herein as poly(DMAPMA), of about 15,000 daltons were rated by their manufacturer for a molecular-weight cutoff value of 500,000 daltons when measured against PEG. We contemplate use of the process of the present invention with other polymers as set forth below, and with other membranes, but the molecular-weight cutoff value of the membrane used should be determined for the particular polymer with which it is used, at least with sufficient accuracy to assure that the membrane will allow monomers and lower-molecular-weight oligomers to pass, while retaining the desired, high-molecular-weight polymer.

Molecular-weight cutoff for any given polymer is the approximate molecular weight of the largest polymer molecules that will pass through the membrane. That is, a membrane with a molecular-weight cutoff of 500,000 daltons against PEG will allow PEG having a molecular weight of less than about 500,000 daltons to pass through the membrane along with water, forming the permeate which is enriched in low-molecular-weight polymer. PEG having a molecular weight greater than 500,000 daltons remains on the input side of the membrane in the retentate. In the preferred configuration, the membranes are in the form of hollow fibers through the hollow lumens of which the retentate circulates, and the permeate containing the monomers and oligomers is collected from the outside of the fibers.

The polymer compositions which may be treated according to the present invention comprise linear polymers having molecular weights within the range from about 2000 to about 10 million daltons, preferably from about 30,000 to about 1.5 million daltons, and solutions of these polymers in water or lower alcohols, the compositions containing monomers from which the polymers were polymerized, and oligomers of these monomers. For any given polymer composition, polymer molecules will exist having a finite range of molecular weights; that is, even when an attempt is made to control the molecular weight of the polymer to a single value, the actual molecules of polymer will have molecular weights distributed around that value. The term "polymers", as used herein, refers to the polymer molecules having a finite molecular-weight distribution which comprise a polymer composition. Polymers having low molecular weights, i.e. below about 2000 daltons, will tend to pass through the membrane filter, and will also tend to be absorbed by the cation exchange resin. Polymers having molecular weights above about 10 million daltons tend to require excessive dilution to lower their viscosities to practical levels for ultrafiltration and ion exchange. The polymers to be treated according to the present invention contain an amine group attached to the polymer backbone, either as a substituent group attached to a carbon on the polymer backbone, or as a linking group in the polymer backbone itself. Where the amine group is a substituent, it may be attached to the carbon of the polymer backbone through a linking group which may be a hydrocarbon group, including alkyl, aryl, alkaryl or aralkyl, a substituted hydrocarbon group, or a substituted or unsubstituted hydrocarbon containing heteroatom linkages such as amine, amide, carbonyl, ester, ether and thioether linkages and the like. The polymers are also preferably water soluble, although solubility in a lower alcohol, that is, an alcohol having from one to five carbon atoms, would allow dilution of the polymer for treatment according to the present process. Amine-containing polymers having particularly low viscosity could be treated according to the present invention without dilution, and are thus within the scope of the invention regardless of their solubility.

The monomers and oligomers removed by the process of the present invention are the monomers from which the polymers described above are polymerized, and the low-molecular-weight polymeric products of the polymerization, or oligomers, generally dimers, trimers and tetramers of the monomer, but including any such low-molecular-weight polymers having molecular weights up to about 500 daltons. Those with molecular weights higher than about 500 daltons diffuse with difficulty into the gel phase of the resin, and thus are not effectively removed. As referred to herein, the term "residual monomers" refers to monomers and oligomers, up to a molecular weight of about 500 daltons, of the amine-containing polymers.

The process of the present invention may be carried out at temperatures between the freezing point and the boiling point of the polymer solution to be treated. The preferred temperature is from room temperature to about 60° C.; above about 60° C. the ultrafiltration membrane may tend to degrade excessively. The preferred pressure across the ultrafiltration membrane is about 70 to about 210 kiloPascals; lower pressures may be used, but filtration times will be long, and higher pressures may be used if the particular membranes will withstand them. The preferred viscosity of the polymer or polymer solution to be treated according to the present invention is below about 100 centipoises at the temperature to be used; the viscosity can be controlled within reasonable limits by varying the concentration of polymer in the solvent and by varying the process temperature.

The following examples are intended to illustrate the invention, and not to limit it except as it is limited in the claims. All percentages are by weight unless otherwise specified, and all reagents are of good commercial quality unless otherwise specified.

EXAMPLE 1

This example illustrates the process of the present invention by removing residual monomers from a linear polymer of dimethylaminopropylmethacrylamide.

An ion exchange column 15 mm in diameter and 60 cm long was filled to a depth of 30 cm with strong acid, gel cation exchange resin having a cation exchange capacity of 5.1 meq/g and prepared by sulfonation of styrene copolymer crosslinked with 8% divinylbenzene. Poly(dimethylaminopropylmethacrylamide) having an anion exchange capacity of 5.7 meq/g, a weight-average molecular weight of 212,267 daltons, a number-average molecular weight of 653,567 daltons, a mode of 498,333 daltons, and 3.53 wt % of the polymer having a molecular weight less than 50,000 daltons, (as measured by gel permeation chromatography against a polyacrylamide standard) was diluted with deionized water to 10% solids and pumped through the column at a rate of approximately 400 ml/hour (8 bed volumes/hour). The poly(dimethylaminopropylmethacrylamide) solution that eluted from the columns was diluted to 3% solids with deionized water and circulated through a Romicon® HF1-43-PM500 hollow fiber ultrafiltration unit having a hollow-fiber surface area of 0.093 $m^2$, a fiber diameter of 1.1 mm, a molecular-weight cutoff of 500,000 daltons against PEG and a length of 30.5 cm (Romicon Inc., Woburn, Ma.). Deionized water was added to the retentate (the solution which continued to circulate) during this step to replace water which passed through the membrane (the permeate). The term "diafiltration" applies to this particular type of ultrafiltration wherein water is added to the retentate to replace the removed water. Samples of retentate were taken for residual-monomer analysis based on the total volume of permeate which passed through the membrane, as a multiple of the original volume of retentate. Diafiltration until a volume of permeate equal to the original retentate volume has passed through the membrane is designated below as diafiltration for one volume replacement.

The samples of untreated polymer, unfiltered column effluent and diafiltration retentate after the volume replacements indicated in Table I, below, were dissolved in methanol and filtered through a filter having a 10,000-dalton molecular-weight cutoff to prepare them for residual-monomer analysis. The residual-monomer content for each sample was determined gas chromatographically using a nitrogen-phosphorus detector, and was expressed in micrograms of monomer per gram of polymer solids in the samples ($\mu$g/g or ppm), and is shown in Table I, below.

TABLE I

| Monomer Removal With Gel Cation Exchange Resin and Diafiltration | |
|---|---|
| Sample | Monomer ($\mu$g/g) |
| Diluted, Untreated Polymer | 37,498 |

TABLE I-continued

Monomer Removal With Gel Cation Exchange Resin and Diafiltration

| Sample | Monomer (μg/g) |
| --- | --- |
| Ion-Exchange Treated Polymer | 280 |
| UF-1 Volume Replacement | 179 |
| UF-3 Volume Replacements | 41 |
| UF-7 Volume Replacements | 14 |
| UF-9 Volume Replacements | 7 |
| UF-10 Volume Replacements | 8 |

EXAMPLE 2

This example illustrates the process of the present invention by removing residual monomers from a linear polymer of dimethylaminopropylmethacrylamide using two ion-exchange resin beds.

A second ion exchange column was prepared identical to the first, and both columns were equipped with heating jackets and were held at 60° C. during operation. The poly(dimethylaminopropylmethacrylamide) of Example 1 was diluted with deionized water to 8% solids and pumped through each of the two columns consecutively at a rate of approximately 400 ml/hour (8 bed volumes/hour). The column effluent was diluted and diafiltered for 10 volume replacements, and the residual monomer content of the solutions were determined, as described in Example 1. The results are shown in Table II, below.

TABLE II

Monomer Removal With Gel Cation Exchange Resin and Diafiltration

| Sample | Monomer (μg/g) |
| --- | --- |
| Diluted, Untreated Polymer | 40,749 |
| Ion-Exchange Treated Polymer | 202 |
| UF-1 Volume Replacement | 155 |
| UF-3 Volume Replacements | 59 |
| UF-5 Volume Replacements | 43 |
| UF-7 Volume Replacements | 23 |
| UF-9 Volume Replacements | 21 |
| UF-10 Volume Replacements | 10 |

EXAMPLE 3

This example illustrates treating a dimethylaminopropylmethacrylamide polymer according to the present invention at a lower temperature and lower flow rate.

The procedure of Example 2 was repeated except that the ion exchange columns were unheated and the polymer solution was pumped through them at room temperature. The flow rate of the cooler polymer solution through the columns was one bed volume per hour, or approximately 50 ml/hr, because of the higher solution viscosity. The column effluent was collected in three 15-bed-volume (750 ml) fractions, and the residual monomer content of each fraction was determined as in Example 1. The first fraction was diluted to 2.5% solids with deionized water and diafiltered for 10 volume replacements as described above, using the same equipment and filter as in Example 1. The residual monomer levels were determined and reported as in Example 1, and the results are shown in Table III, below.

TABLE III

Monomer Removal With Gel Cation Exchange Resin and Diafiltration, Ambient Temperature

| Sample | Monomer (μg/g) |
| --- | --- |
| Diluted, Untreated Polymer | 40,760 |
| Ion-Exchange Treated Polymer, Fract. 1 | 240 |
| Ion-Exchange Treated Polymer, Fract. 2 | 171 |
| Ion-Exchange Treated Polymer, Fract. 3 | 161 |
| UF-1 Volume Replacement | 128 |
| UF-3 Volume Replacements | 46 |
| UF-5 Volume Replacements | 0[1] |
| UF-7 Volume Replacements | 0[1] |
| UF-9 Volume Replacements | 0[1] |
| UF-10 Volume Replacements | 0[1] |

[1]None detected; limit of detection for the procedure is approximately 5 μg/g

EXAMPLE 4

This comparative example illustrates the less effective removal of residual monomers from the polymer of Example 1 when the polymer is treated first by ultrafiltration and subsequently by ion exchange.

The procedure and sample of Example 3 was used, except that the polymer was diluted with deionized water to produce a reasonable flow rate, and was diafiltered for three volume replacements using the same equipment and a Romicon HF4-75-PM500 hollow fiber ultrafiltration membrane having a surface are of 0.372 m$^2$, a fiber diameter of 1.9 mm, a molecular-weight cutoff of 500,000 daltons against PEG and a length of 61 cm. The diafiltered polymer solution was then concentrated to 6% solids by discontinuing the addition of deionized water to the retentate as diafiltration proceeded, and the concentrated solution was pumped through the pair of ion-exchange resin columns at a flow rate of approximately 200 ml/hr (4 bed volumes per hour). The column effluent was collected in 250-ml (5 bed volume) fractions. The residual monomer content of the initial polymer solution, the solution after diafiltration, and six consecutive fractions of column effluent was determined as in the preceding examples, and the results are shown in Table IV, below.

TABLE IV

Monomer Removal With Diafiltration Followed by Ion Exchange

| Sample | Monomer (μg/g) |
| --- | --- |
| Diluted, Untreated Polymer | 39,938 |
| UF-3 Volume Replacements | 840 |
| UF + Ion Exchange, Fract. 1 | 103 |
| UF + Ion Exchange, Fract. 2 | 55 |
| UF + Ion Exchange, Fract. 3 | 50 |
| UF + Ion Exchange, Fract. 4 | 52 |
| UF + Ion Exchange, Fract. 5 | 54 |
| UF + Ion Exchange, Fract. 6 | 53 |

The results of Table IV clearly show that ultrafiltration alone is not as effective at removal of residual monomer, and that ultrafiltration followed by ion exchange is surprisingly less effective at removing monomer than ion exchange followed by ultrafiltration.

EXAMPLE 5

This comparative example illustrates the use of a macroreticular cation exchange resin with a relatively high crosslinker content in the process of the present invention, again with the polymer being diafiltered prior to the cation-exchange step.

The procedure of Example 4 was repeated, except that three ion-exchange columns were packed to a depth of 17 cm with strong acid, macroreticular cation exchange resin having a cation exchange capacity of 4.85 meq/g and prepared by sulfonation of styrene copolymer crosslinked with 20% divinylbenzene. The polymer solution, subsequent to diafiltration, was pumped through the three ion-exchange columns in parallel at flow rates of 4, 8 and 16 bed volumes per hour (120, 240, 480 ml/hr). The residual monomer level in the effluent from the columns was determined at each flow rate after the indicated volumes of polymer solution had been treated, and the results are shown below in Table V.

TABLE V

Monomer Removal by Macroreticular Cation Exchange Resin

| Bed Volumes at 4 BV/Hr | Resid. Mon., µg/g | Bed Volumes at 8 BV/Hr | Resid. Mon., µg/g | Bed Volumes at 16 BV/Hr | Resid. Mon., µg/g |
|---|---|---|---|---|---|
| 2.5 | 20 | 4.5 | 14 | 8.5 | 21 |
| 19.2 | 265 | 211.6 | 1125 | 433.0 | 1105 |
| 63.1 | 853 | 268.7 | 1093 | 484.2 | 1092 |
| 199.9 | 1075 | — | — | — | — |

The results shown in Table V confirm that the use of ultrafiltration prior to cation exchange results in higher leakage of monomer in the effluent from the cation exchange column. They further show, however, that the capacity of highly crosslinked, macroreticular resins is acceptable for use in the process of this invention, despite the fact that this particular resin was exhausted somewhat more rapidly than that of the gel resins used in the previous examples. Without wishing to be bound by theory, we believe that this is caused by the poorer kinetics of this more highly crosslinked gel phase of the resin rather than by any deficiency of macroreticular resins when employed in the present process; the tighter structure of the gel phase in this resin is believed to prevent the monomer from diffusing as rapidly into, and out of, the resin.

EXAMPLE 6

This comparative example illustrates the use of a cation exchange resin having a lower crosslinking level, again with the polymer solution being diafiltered prior to cation exchange.

The procedure of Example 4 was repeated except that three ion-exchange columns were packed to a depth of 17 cm with strong acid, gel cation exchange resin having a cation exchange capacity of 5.2 meq/g and prepared by sulfonation of styrene copolymer crosslinked with 4.5% divinylbenzene. The polymer solution, subsequent to diafiltration, was pumped through the three ion-exchange columns in parallel at flow rates of 1, 8 and 16 bed volumes per hour (30, 240, 480 ml/hr). The residual monomer level in the effluent from the columns was determined at each flow rate after the indicated volumes of polymer solution had been treated, and the results are shown below in Table VI.

TABLE VI

Monomer Removal by Lightly Crosslinked, Gel Cation Exchange Resin

| Bed Volumes at 1 BV/Hr | Resid. Mon., µg/g | Bed Volumes at 8 BV/Hr | Resid. Mon., µg/g | Bed Volumes at 16 BV/Hr | Resid. Mon., µg/g |
|---|---|---|---|---|---|
| 1.0 | 25 | 5.0 | 25 | 9.5 | 21 |
| 3.0 | 14 | 21.5 | 17 | 42.5 | 24 |
| 5.0 | 15 | 37.5 | 18 | 74.5 | 29 |
| 7.0 | 18 | 61.5 | 26 | 125.6 | 43 |
| 14.0 | 18 | 105.7 | 25 | 162.1 | 29 |
| 24.1 | 69 | 201.2 | 119 | 198.7 | 32 |
| 33.4 | 36 | 279.7 | 260 | 369.4 | 536 |
| 37.3 | 43 | 306.8 | 351 | 524.8 | 1310 |
| 77.8 | 37 | 324.6 | 442 | 595.2 | 1830 |
| 123.9 | 48 | 356.7 | 525 | — | — |

The results shown in Table VI confirm yet again that higher leakage results when ultrafiltration precedes the cation exchange. It also confirms that cation exchange resins with lower crosslinker levels have adequate capacity to function properly in the process of the present invention.

Reduction of residual monomer in poly(DMAPMA) from levels of approximately 350,000 ppm to about 175 ppm was also observed upon treatment with the ion exchange resin of Example 1; subsequent ultrafiltration treatment would similarly reduce the monomer to extremely low levels.

We claim:

1. A process for removing residual monomers and oligomers with molecular weights smaller than about 500 daltons from a polymer composition, which process comprises the sequential steps of first treating the composition with a strong-acid, aromatic cation exchange resin with a crosslinker level from about 2% to about 25%, and subsequently subjecting the composition to ultrafiltration with an ultrafiltration membrane to remove the remaining monomers and oligomers from the ultrafiltration retentate, wherein the polymer composition comprises linear, amine-containing polymers having a molecular weight within the range of from about 2000 to about 10 million daltons, or solutions thereof in water or a lower alcohol, and wherein the membrane has a molecular weight cutoff, measured against the polymers from which the monomers and oligomers are to be removed, of from about 10,000 to about 15,000 daltons.

2. The process of claim 1 wherein the amine-containing polymers have a molecular weight of from about 30,000 to about 1.5 million daltons.

3. The process of claim 1 wherein the composition has a viscosity of about 100 centipoises or less.

4. The process of claim 3 wherein the composition is a solution of the polymers in water.

5. The process of claim 3 wherein the composition is a solution of the polymers in a lower alcohol.

6. The process of claim 5 wherein the lower alcohol is methanol.

7. The process of claim 5 wherein the lower alcohol is ethanol.

8. The process of claim 5 wherein the lower alcohol is n-propanol.

9. The process of claim 1 wherein the cation exchange resin has a crosslinker level of from about 2% to about 10%.

10. The process of claim 1 wherein the cation exchange resin has sulfonic acid cation exchange groups.

11. The process of claim 1 wherein the cation exchange resin has phosphonic acid cation exchange groups.

* * * * *